May 17, 1966 W. STEINKOPF 3,251,932

SUPERHETERODYNE CIRCUIT ARRANGEMENTS

Filed Sept. 30, 1964

INVENTOR.
WOLFGANG STEINKOPF
BY
[signature]
AGENT

United States Patent Office 3,251,932

Patented May 17, 1966

3,251,932

SUPERHETERODYNE CIRCUIT ARRANGEMENTS

Wolfgang Steinkopf, Krefeld, Germany, assignor to North American Philips Company, Inc., New York, N.Y., a corporation of Delaware Filed Sept. 30, 1964, Ser. No. 400,442

Claims priority, application Germany, Oct. 31, 1963, P 32,890

10 Claims. (Cl. 178—5.8)

The invention relates to a circuit arrangement for mixing a frequency-modulated oscillation with an amplitude-modulated comparison voltage; such an arrangement is employed inter alia for producing the intercarrier between the image carrier and the sound carrier of a television signal. The problem involved is to prevent the amplitude modulation of the comparison voltage used as a mixing oscillation from being transmitted to the oscillation of the difference frequency, the useful signal of which is contained in the frequency modulation. The amplitude modulation may, it is true, be suppressed by a limiter circuit, particularly in the case of a high degree of amplitude modulation, as is conventional in a television signal, but in this case a very strong overexcitation would be required, so that an important loss in amplification was involved. It is therefore desirable to suppress the amplitude modulation already in the formation of the oscillation of difference frequency.

In an arrangement of the kind set forth this may be achieved by simple means, if in accordance with the invention use is made of a mixing stage, the amplification of which decreases with an increasing amplitude of the input oscillation. The mixing stage preferably comprises an amplifying element, the amplification factor of which depends upon the working point, which is shifted in accordance with the amplitude of the input oscillation so that the amplitude fluctuations are counteracted at least as far as they are lying within the frequency range of the useful signal transmitted by frequency modulation.

The invention will be described more fully with reference to the drawing, in which.

Figure 1:
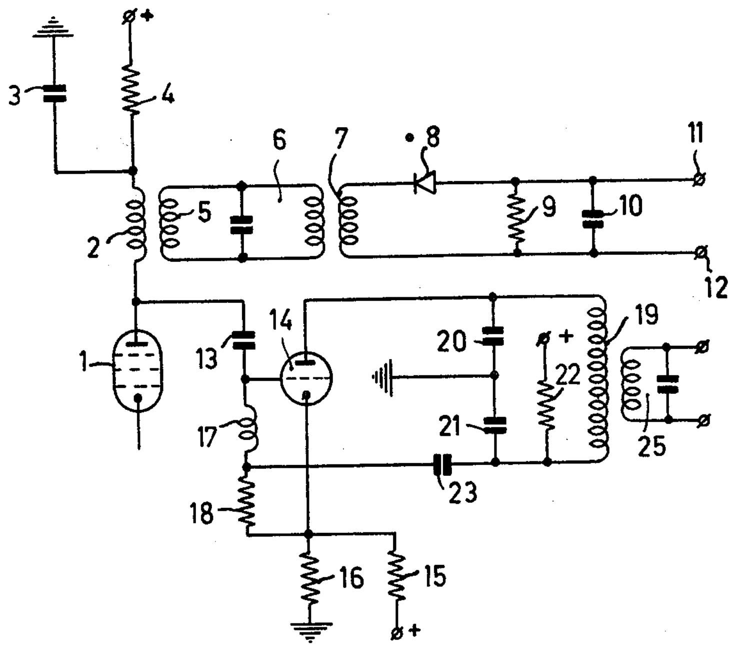
FIG. 1 is a circuit diagram of a portion of a television receiver incorporating the present invention.

The frequency-modulated oscillation and the amplitude-modulated comparison oscillation (sound intermediate frequency and image intermediate frequency) are applied to a tube 1, the anode circuit of which includes the series combination of a coil 2 and a resistor 4 of, for example, 1K ohm, shunted by a capacitor 3 of, for example, 1000 pf. to earth. The coil 2 is connected through a coil 5 to a resonant circuit 6, to which by way of a coil 7 is connected the video demodulator formed by a diode 8 and a load with a resistor 9 and a parallel capacitor 10. The amplitude-modulated incoming video signal is derived from terminals 11 and, subsequent to amplification, it is applied to the display tube of the television receiver.

The mixture of the two intermediate-frequency oscillations is derived from the anode of the tube 1 through a coupling capacitor 13 of, for example, 5.6 pf. and it is applied to the grid of a triode 14. The cathode of said triode may be connected to earth or, as is shown in the drawing, through a voltage divider consisting of resistors 15 and 16, to the supply source. The cathode circuit may also include an element stabilising the cathode current and hence the working point, for example an ohmic resistor or such a resistor that the voltage drop decreases with an increasing current.

The grid of the tube 14 is connected furthermore through an inductor 17 of for example 12 μh. and a resistor 18 of for example 22K ohms to the cathode, so that the tube normally has no grid bias voltage. The anode circuit of the tube 14 includes a resonant circuit tuned to the difference frequency and consisting of a coil 19 and the series combination of two capacitors 20 of for example 56 pf. and 21 of for example 560 pf., the tapping of which is connected to earth, whilst the junction of the capacitor 21 and the coil 19 is connected on the one hand through a high impedance for example a resistor 22 of 4K ohms to the supply source and on the other hand through a capacitor 23 of for example 150 pf. to the junction of the coil 17 and the resistor 18. The anode circuit of the tube 14 includes therefore a capacitative three-point connection (Colpitt's circuit) and a feedback is obtained for the difference frequency oscillation of for example 5.5 mc./s., to which the circuit 19, 20, 21 is tuned. The oscillation of the difference frequency may be derived from a resonant circuit coupled with the coil 19.

From the anode of the tube 1 an intermediate-frequency signal is applied to the arrangement comprising the tube 14, said signal consisting of the superposition of the amplitude-modulated image I.F. signal and the frequency-modulated sound I.F. signal. Owing to the coil 17 the mixing stage has a high input impedance for these oscillations. The envelope of this complex signal corresponds to FIG. 2, if a black line is followed by lines of higher brightness until the line is white, after which the brightness decreases until the line is black.

Figure 2:
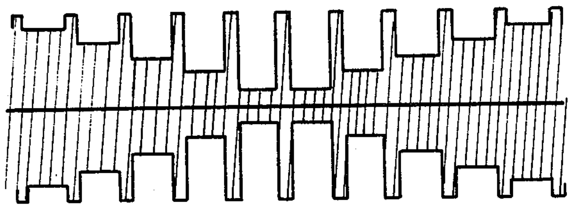
FIG. 2 illustrates the waveform of signals at the anode of tube 1 of FIG. 1.
Figure 3:
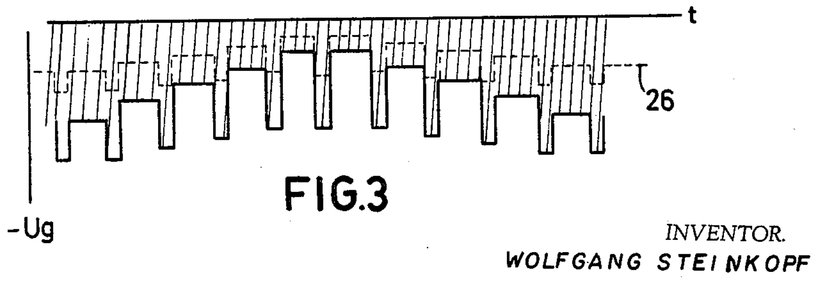
FIG. 3 illustrates the waveform of signals at the grid of tube 14 of FIG. 1.

In accordance with the invention the amplification of the mixing stage with the tube 14 can be reduced with an increasing amplitude of the input oscillations by producing at the grid of the tube 14 a signal which has approximately the waveform shown in FIG. 3. The average value of the oscillation variations and hence the grid bias voltage which determines the amplification and the conversion amplification of the tube 14 for oscillations of the difference frequency, then exhibits approximately the course of the curve 26, shown in broken lines. However, it varies considerably with the image information contents so that with a high carrier amplitude (see FIG. 2) a higher negative bias voltage $-U_g$ is obtained than with a lower carrier amplitude. With a time constant which is small with respect to the periods of the line pulses or with respect to the periods of the highest frequency interfering with the difference oscillation in the case of low-frequency signal of for example 20 kc./s., the grid bias voltage follows up substantially the instantaneous values of the carrier amplitude.

The control-voltage of the waveform shown in FIG. 3 can be obtained by cutting off, in known manner, the positive halfwaves, for example by means of a rectifier, included in the series branch and allowing only the negative half periods to pass or by means of a rectifier included in the transverse branch and strongly damping the positive half periods. In the embodiment shown in FIG. 1 peak clipping is carried out with a discharge time constant which amounts to about 3 μsec. with a capacity value (of 13, 23, 20, 21) of about 135 pf. and a resistance of about 22K ohms. This time constant is in the first place a measure for the discharge; for charging the internal resistance of the grid-cathode path, which may be considerably smaller, is important so that charging may be performed with a still shorter time constant. It is achieved in this manner that the positive values of the I.F. signal of FIG. 2 are substantially all at the same potential corresponding with the cathode potential and the grid current input potential of the tube 14 respectively. The envelope shown in the lower part of FIG. 3 therefore assumes each time double the value of the instantaneous carrier amplitude, so that also the potential values corresponding to the curve 26 increase by a factor 2. Thus, in a simple manner, very high values of the grid bias voltage are obtained, which appears as a direct voltage with a low smoothing time constant at the electrodes of the capacitors 13 and 23, connected to the grid of the tube 14.

Since for the oscillation of difference frequency, modulated by the sound signals only the elimination of the amplitude modulation within the range of the sound signals is concerned, the time constant at the grid of the tube 14 may be chosen still higher up to the range of the high modulation frequencies, for example up to a time constant of 0.1 msec. Any residual amplitude fluctuations of higher frequency are readily suppressed in the further limiting stages and are, in fact, inaudible.

The tube 14 has a characteristic curve, within the variation region of the grid bias voltage 26, which is important in this case, so that the steepness varies in a ratio of about 1:2 to 1:5; in a similar manner the mutual mixing conductance and hence also the amplitude fluctuation of the obtained oscillation of difference frequency varies; the amplitude modulation thereof is thus reduced to the said extent with respect to the amplitude modulation of the image carrier.

A corresponding, if desired, additional effect may be obtained by feeding back positively or negatively the mixing stage with the tube 14 for the oscillation of difference frequency in a manner such that with a greater amplitude of said oscillation a stronger damping or with a smaller amplitude a greater amplification is obtained. This is achieved by a feedback within the given ranges across the capacitor 23, which does not give rise, however, to self-excitation, but which produces negative damping which becomes manifest in a variation of the resonance resistance of the circuit 19, 20, 21. With a greater input amplitude (on the left-hand side and on the right-hand side of FIG. 2) the tube 14 has a higher negative bias voltage and hence a smaller amplification and therefore the resonant circuit 19, 20, 21 has approximately its normal, comparatively low resonance resistance, which may, if desired, be reduced further by means of a parallel resistor. With weak input signals (in the centre of FIGS. 2 and 3) the tube 14 has only a low negative bias voltage and hence a greater amplification, so that a considerable negative damping is obtained and the resonance resistance of the circuit 19, 20, 21 is considerably higher. With a weak input signal the output resistance and hence also the amplification is high and conversely, so that, like with amplitude counter-modulation, levelling of the amplitude values is achieved.

If the bias voltage of the tube 14 varies in opposite sense with the amplitude of the image signals, a negative feedback varying with the input amplitude can be obtained, when the grid is connected to a point of the output circuit which has the same phase with respect to the anode. Such a variation of the grid bias voltage may be obtained by disposing the working point on the cut-off point of the anode current-grid voltage characteristic curve (anode rectification).

In the embodiment shown in FIG. 1 the particular advantage is obtained that on the one hand the conversion amplification and on the other hand the output resistance vary to the same extent with the grid bias voltage so that the two effects are relatively multiplied, and the very high amplitude modulation of the image carrier can be substantially completely eliminated or can be eliminated at any rate to an extent such that a correct limitation in the further arrangement is obtained without any difficulty and without considerable loss of amplification. It is even possible, without involving difficulties, to obtain overcompensation so that the amplitude of the intercarrier is smaller with a greater I.F. image amplitude.

A further improvement may be obtained by applying the input oscillations of the mixing stage by way of a limiter, which cuts off at least part, for example the positive-going synchronizing pulses of the signal. In the arrangement shown in FIG. 1 the grid-cathode path of the tube 14 is operative as a limiter, owing to the time constant chosen, so that interference pulses and even any synchronising pulses are strongly restricted. The voltage at the grid of the tube 14 contains also a direct-voltage component which corresponds to the amplitude of the frequency-modulated oscillation. The practically constant working point shift thus obtained may be reduced or eliminated by known stabilising measures, for example by means of a connection between the anode and the grid, which allows only direct current and very low frequencies to pass.

It is known that the video signal may contain oscillations of a frequency corresponding approximately to ½, ⅓ etc. of the distance between the image carrier and the sound carrier. By means of a diode an oscillation can be obtained therefrom, which corresponds with an oscillation of normal difference frequency, said oscillation having a strong, interfering amplitude modulation, for example in the rhythm of the raster pulses. The interfering effect thereof may be avoided by deriving the preferably I.F. image carrier as a comparison oscillation from the amplifying channel at a point where the transmission curve has a low value in the region of the interfering sidebands. This may be achieved by adjusting the transmission filter 2, 5, 6, 7 for coupling out the image carrier from said frequency range preferably to the sideband of 2.75 mc./s. (with a distance between sound carrier and image carrier of 5.5 mc./s.). With a view to the desirable uniform transmission curve in this range, the preceding amplifier must be such that prior to the filter 2, 5, 6, 7 it exhibits a strong drop at said place, so that oscillations can be derived from said place, which have to be applied to the mixing circuit for producing the intercarrier.

What is claimed is:

1. A circuit for mixing a frequency-modulated oscillation with an amplitude-modulated comparison oscillation, comprising a source of said oscillations, mixing means having an input circuit and an output circuit, and means applying said frequency-modulated and amplitude-modulated oscillations to said input circuit, said mixing means comprising an amplifier device and having an amplification that varies inversely with the amplitude of oscillations applied to said input circuit, whereby the amplitude of mixed oscillations in said output circuit is substantially independent of the amplitude modulation of said comparison oscillation.

2. A circuit for mixing a frequency-modulated oscillation with an amplitude-modulated comparison oscillation, comprising a source of said oscillations, an amplifier device having input, output and common terminals, means applying said frequency-modulated and amplitude-modulated oscillations between said input and common electrodes, output circuit means connected between said output and common electrodes, said device having an amplification dependent upon the bias between said input and common electrodes, and means providing a bias for said device that is dependent upon the amplitude of said amplitude-modulated oscillations, whereby the amplitude of mixed oscillations in said output circuit is substantially independent of the amplitude of said amplitude-modulated oscillations.

3. A circuit for mixing a frequency-modulated oscillation with an amplitude-modulated comparison oscillation, comprising a source of said oscillations, an amplifier device having input, common and output electrodes, and having an amplification factor that is dependent upon the bias between said input and common electrodes, resonant output circuit means tuned to the difference frequency between said frequency-modulated oscillation and said amplitude-modulated oscillation, means connecting said output circuit between said output and common electrodes, and input circuit means applying said oscillations between said input and common electrodes whereby said oscillations are peak rectified to provide a bias between said input and common electrodes that is dependent upon the amplitude modulation of said comparison oscillation, the discharge time constant of said input circuit means being short with a respect to the period of the highest modulation signals of said frequency modulated oscillation, whereby the amplitude of mixed oscillation in said output circuit is substantially independent of the amplitude modulation of said amplitude-modulated oscillations.

4. The circuit of claim 3, comprising feedback means connected between said resonant output circuit means and said input circuit means whereby the resonance resistance of said output circuit varies with the amplitude of oscillations applied to said input circuit means.

5. A circuit for mixing a frequency-modulated oscillation with an amplitude-modulated oscillation, comprising a source of said oscillations, an electron discharge device having cathode, grid and anode electrodes, a source of operating voltage having first and second terminals, means connecting said cathode electrode to said first terminal, resonant output circuit means tuned to the difference frequency of said frequency-modulated and amplitude-modulated oscillations connected between said anode electrode and said second terminal, inductor and resistance means serially connected between said grid and cathode electrodes, capacitor means for applying said frequency-modulated and amplitude-modulated oscillations to said grid electrode, whereby oscillations applied to said grid electrode are peak-rectified, the discharge time constant of the peak rectification circuit being short with respect to the period of the highest modulation signals of said frequency-modulated oscillation, whereby the amplitude of mixed oscillations in said output circuit is substantially independent of the amplitude modulation of said amplitude-modulated oscillation.

6. A television circuit for mixing frequency-modulated sound intermediate frequency oscillations and amplitude-modulated image intermediate frequency oscillations for producing difference frequency oscillations that are substantially independent of the amplitude modulation of said image intermediate frequency oscillations, said circuit comprising a source of said sound and image oscillations, mixing means having an input circuit and an output circuit, means applying said oscillations to said input circuit, said output circuit comprising resonant circuit means tuned to said difference frequency, said mixing means having an amplification factor dependent upon the amplitude of bias signals applied thereto, and means for varying the bias of said mixing means in response to the amplitude of said oscillations.

7. A television circuit for mixing frequency-modulated sound intermediate frequency oscillations and amplitude-modulated image intermediate frequency oscillations for producing difference frequency oscillations that are substantially independent of the amplitude modulation of said image intermediate frequency oscillations, said circuit comprising a source of said sound and image intermediate frequency oscillations, an amplifier device having input, common and output electrodes, input circuit means for applying said oscillations between said input and common electrodes whereby said oscillations are rectified, said input circuit having a discharge time constant that is small with respect to the periods of line pulses of said image intermediate frequency oscillations, whereby the amplification of said device is a function of the amplitude of said image intermediate frequency oscillations, and resonant output circuit means tuned to said difference frequency connected to said output electrode.

8. The circuit of claim 7, comprising feedback means connected between said resonant circuit and said input circuit for varying the resonance resistance of said output circuit as a function of said amplitude of said image intermediate frequency oscillations.

9. A television circuit for mixing frequency-modulated sound intermediate frequency oscillations and amplitude-modulated image intermediate frequency oscillations for producing difference frequency oscillations that are substantially independent of the amplitude modulation of said image intermediate frequency oscillations, said circuit comprising a source of said sound and image intermediate frequency oscillations, an electron discharge device having cathode, grid and anode electrodes and having an amplification factor dependent upon the grid-cathode bias applied thereto, input circuit means connected to apply said oscillations between said grid and cathode electrodes whereby said oscillations are peak rectified by the grid-cathode diode of said discharge device, said input circuit having a time constant that is short with regard to the period of the line pulses of said image intermediate frequency oscillations, whereby the grid-cathode bias of said device is a function of the amplitude of said image intermediate frequency oscillations, and resonant output circuit means tuned to said difference frequency connected to said anode electrode.

10. The circuit of claim 9, comprising feedback means connected between said output circuit and said input circuit whereby the resonance resistance of said output circuit varies with variations in the amplification factor of said device.

No references cited.

DAVID G. REDINBAUGH, *Primary Examiner.*

J. McHUGH, *Assistant Examiner.*